Nov. 6, 1962    R. L. SCHENK, JR    3,062,910
SEALING AND PRESSURE RELIEF DEVICE FOR GALVANIC CELLS
Filed March 9, 1961

INVENTOR
RAYMOND L. SCHENK, JR.
BY John E. Stryker
ATTORNEY

United States Patent Office 3,062,910
Patented Nov. 6, 1962

3,062,910
SEALING AND PRESSURE RELIEF DEVICE FOR GALVANIC CELLS
Raymond L. Schenk, Jr., Minneapolis, Minn., assignor to Gould-National Batteries, Inc., St. Paul, Minn., a corporation of Delaware
Filed Mar. 9, 1961, Ser. No. 94,475
7 Claims. (Cl. 136—133)

This invention relates to a combination sealing and pressure relief device for galvanic cells of the sealed cell type wherein dangerously high internal gas pressures may develop under some conditions of use, such as those resulting from over charging, over discharging, or other malfunctioning of rechargeable sealed cells. Such pressure relief devices usually include a diaphragm which is ruptured when excessively high pressures are created in the cells.

Hheretofore the construction of galvanic cell sealing and pressure relief devices has been such as to make it dfficult to meet specifications requiring rupture of the diaphragms at predetermined pressures within reasonably narrow tolerances and at the same time to provide a reliable, leakproof seal which will be effective throughout a long cell life and when the cells are subjected to a wide range of temperature variations. Assembling of the diaphragm in accurately predetermined relation to a diaphragm perforating member has heretofore been necessary but has been so difficult to accomplish in quantity production procedure that many cells have been defective in that either premature rupture of the diaphragm occurs or the cells explode because of failure of the safety device. Moreover, the unreliability of the sealing means as heretofore constructed has led to a large percentage of cell rejections for failure of the seal.

It is, therefore, an object of my invention to minimize such difficulties and unreliability by providing a cell sealing and pressure release device which can be relied upon to maintain a durable leakproof seal under a wide range of temperature conditions, throughout a long cell life, and also to provide for release of gas by rupture of the diaphragm when a predetermined internal pressure, with close tolerances, is created in the cell.

Another object is to provide a greatly simplified, as well as a reliable combination closure and pressure release device of the class described.

A further and particular object is to provide a gastight and electrolyte-tight closure for galvanic cells of the class described which includes a thin diaphragm having a central portion which is outwardly bendable under fluid pressure, being subject to the pressure within the cell and mounted in cooperative relation to a cover member carrying a rigid tooth the sharp end of which is normally disposed adjacent to the diaphragm, the latter beig breakable by the tooth upon the development of a predetermined high gas pressure in the cell.

The invention also includes certain other novel features of construction which will be more fully pointed out in the following specification and claims.

Referring to the accompany drawing which illustrates a preferred embodiment of my invention, by way of example and not for the purpose of limitation:

Figure 1:
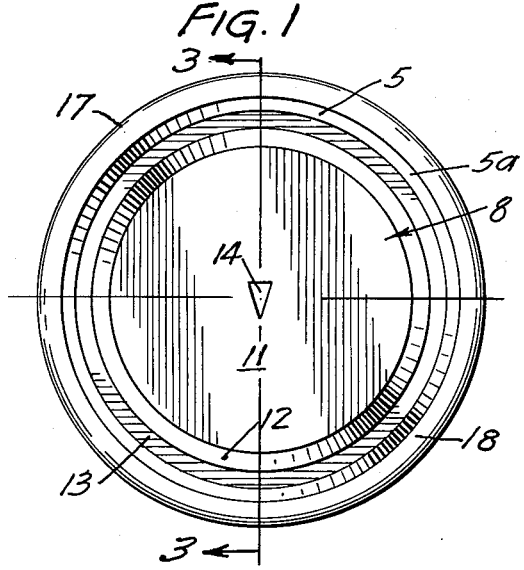
FIGURE 1 is a top view of a galvanic cell embodying my invention.

In the drawing, the numeral 4 indicates a cylindrical wall member defining an opening in the top or cover of a cell of the class described. An annular hard plastic gasket 5 is shown in place within the cylindrical wall member 4. This gasket has a first flange 6 projecting radially outward to rest on the top of the wall 4 and a second flange 7 which projects radially inward and is spaced downwardly from the flange 6. The sealing means of the present invention are generally similar to those described in my co-pending applications Serial No. 47,407 and 47,408, for Reinforced Cell Closure, both filed August 4, 1960.

Like the gasket of my co-pending application Serial No. 47,407, the gasket 5 is formed from a hard dielectric material which is resistant to cold flow and is interposed and radially sealed between the wall member 4 and a cover indicated generally by the numeral 8. Materials which deform very little, or only when large forces are applied, and which do not continue to deform or creep when the forces are applied for a considerable length of time are used in the formation of the gasket 5. A suitable material for the construction of the gasket 5 is nylon, a polymer of hexamethylene diammonium adipate. One such nylon plastic is sold under the trademark "Zytel." This material is characterized by its high compressive and shear strength and is capable of withstanding large stresses without a tendency to cold flow.

A thin diaphragm, preferably constructed from suitable corrosion resistant metal, is indicated generally at 9 and is formed with a peripheral rim 10 projecting upwardly for sealing contact with an inner peripheral surface of the gasket 5.

Important structural details of the cover 8 include its inverted dish-shape comprising a circular raised central portion 11, an integral obliquely downwardly and outwardly flaring flange member 12 and a peripheral flange portion 13 disposed to back-up the rim portion 11 of the diaphragm 9 when the closure is radially sealed. The cover 8 may be formed from cold rolled strip steel, e.g., low carbon SAE 1008 or 1010 and, for alkaline cells, may be nickel plated directly on the steel. Such steel covers of diameters within the range of .75 to .60 inch, approximately .035 inch thick and having #3 or #4 temper, have been found to have the required elasticity and strength to insure a lasting, leakproof seal in conjunction with a gasket 5 of the character described. A small hole 14 may be formed in the member 8 to provide a vent to atmosphere for the chamber between this member and the diaphragm 9.

The illustrated perforating means for diaphragm 9 comprises a rigid tooth 15 projecting downwardly from the cover 8 and having a sharp point 16 positioned approximately in the plane defined by the lower surface of the annular flange portion 13 of the cover 8. The tooth 15 is preferably integral with the cover 8 but may be formed as a separate part and welded or otherwise secured to the lower side of the cover member. A punch having a V shaped point of cross sectional shape corresponding to that of the hole 14 may be used with a die having a cylindrical opening to receive the punch for the formation of the tooth 15 integrally with the cover 8.

To hold the assembly including the gasket 9, rim 10 and cover 8 under radial compression, I provide a reinforcing ring 17 having an inwardly projecting flange 18 overlying the upper surface of the gasket 5 and a pendant flange 19 embracing the outer surface of the cylindrical member 4.

Figure 2:
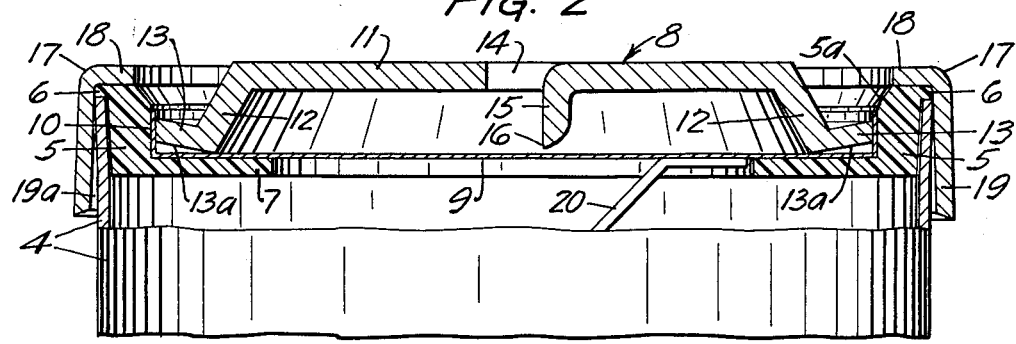
FIG. 2 is a part vertical sectional view and part side elevational view showing the closure and pressure release device assembled and in their relative positions and form prior to the sealing by radial compression.

In the assembly of the several elements they are arranged as indicated in FIG. 2 in nesting relation to the cylindrical wall member 4. As indicated in FIG. 2, the flange member 13, before the radial sealing operation, is inclined outwardly and upwardly at an angle 13a equal to approximately 7°, and the flange 19 of the reinforcing ring 17 has its lower periphery in slightly spaced relation to the wall member 4, as indicated at 19a.

Figure 3:
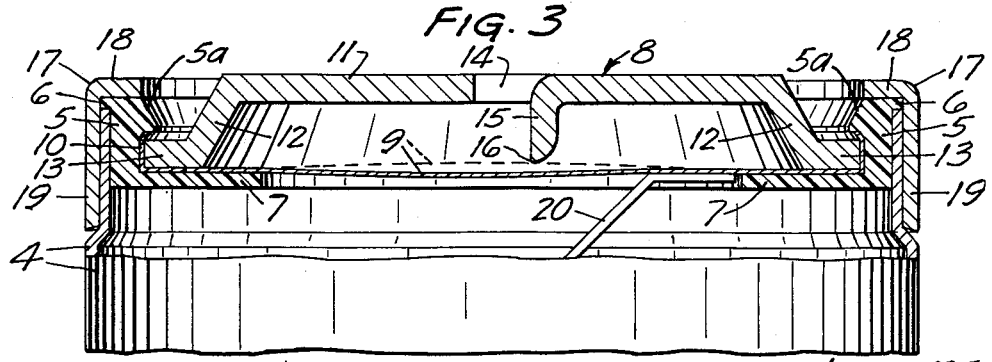
FIG. 3 is a vertical sectional view taken on the line 3—3 of FIG. 1 and showing the closure and device after it has been radially sealed.

To seal the assembly shown in FIG. 2, the several members are placed under sufficient radial compression to deform the gasket 5 as indicated in FIG. 3, against the outer periphery of the cover flange member 13. Sufficient radial pressure is applied to extrude an annular portion 5a of the gasket 5 above the outer periphery of the cover 8 and also to reduce the thickness of the flange 6 of the gasket 5 and force the annular flange portion 13 of the cover 8 from its inclined position to its substantially horizontal position. As a further result of the radial compression, the reinforcing ring 17 is reduced in diameter, together with the portion of the wall member 4 embraced by the flange 19. Such a sealing operation may be performed by the use of a hydraulic press or the like having one die supporting the wall member 4 and a relatively movable reducing die which is formed to apply the required radial pressure while supporting the normally top surface of the cover 8 and straightening the flange portions 13. A permanent seal is thereby formed between the gasket 5 and rim 10 of the diaphragm 9 and also between the outer periphery of the gasket 5 and wall member 4. Reliable and permanent sealing pressure is maintained as a result of the coaction between the gasket 5, having the required elasticity and resistance to cold flow, and the cover 8 having its annular flange members 12 and 13 and of the required elasticity to maintain radially outward sealing pressure even when subject to a wide range of temperature variations. It will be evident that the radially outward pressure maintained by the cover 8 on the diaphragm rim 10 and gasket 5 is resisted and opposed by the reinforcing ring 17. The radial pressure reduces the diameter of the diaphragm 9 sufficiently to cause the central portion of the diaphragm to bulge either toward the point 16 of the tooth 15 or away from it, as indicated in broken lines in FIG. 3. Such variations in the position of the diaphragm 9 at the time of sealing do not materially affect the reliability of the pressure relief device in causing rupture or perforation of the diaphragm when the internal pressure reaches a predetermined high point in the cell. In normal operation of sealed cells gas is formed therein which builds up the internal pressure sufficiently to bend or extend the central portion of the diaphragm 9 to contact or to a position in close proximity to the point of the tooth 15.

For the cells having cylindrical containers my sealing and pressure relief device may constitute an end closure for the container and one of the electrode terminals 20 may be secured to the diaphragm 9, the other electrode terminal being electrically connected to the container. My device may be used independently of the electrode terminals and intercell connectors for cells having containers of shapes other than cylindrical, or for any sealed cell for which a pressure relief device of relatively small diameter is preferred as an insert in a relatively large cell cover.

Numerous and severe tests of my invention have shown, for example, that a cell having a diaphragm of .762 inch outer diameter and thickness of .007 inch formed from nickel plated strip steel, dead soft, the nickel plating being .001 to .0015 inch thick, will be relieved of excess gas pressure by the rupture of the diaphragm 9 at the point of the tooth 15 upon the development of internal pressure equal to 180 p.s.i. plus or minus 5 p.s.i. Other cells having diaphragms of .006 inch thickness but otherwise like the diaphragm of .007 inch thickness were relieved of excess pressure when the internal pressure reached 155 p.s.i.

By similar variation of the diameter, thickness and composition of the metal diaphragm, rupture at any other preselected pressure may be reliably predicted.

Experience in assembly procedure clearly indicates that the position of the diaphragm at the time of the sealing of the cell is not critical and that there are no other assembly problems when the dimensions and composition of the sealing and pressure release components of my device are maintained within practical tolerance limits.

The effectiveness of the sealing means herein described is like that of my co-pending application Serial No. 47,407 in that a large percentage of the cells withstand overcharging, thermal shock, high humidity and other abusive conditions throughout a long cell life.

I claim:

1. In a normally sealed galvanic cell having a container subject to internal gas pressure, a sealing and pressure relief device comprising, a cylindrical wall member defining an opening communicating with the interior of said container; an annular hard plastic gasket which is resistant to cold flow fitting within said cylindrical wall member and having a first flange extending over the top of said wall member and a second flange spaced downwardly from said first flange within the said wall member; a thin diaphragm supported on said second flange for closing said opening and having an upwardly projecting peripheral rim engaging an annular surface of said gasket; an annular, inverted, dish-shaped cover having a vent opening and an outer periphery disposed to back-up said rim of the diaphragm; a rigid tooth projecting downwardly from said cover and having a sharp end normally positioned adjacent to the upper surface of said diaphragm; and means confining said gasket under radial compression and in gas-tight sealing relation to said wall member and diaphragm at the periphery of said cover, said diaphragm having sufficient strength to resist puncture by said tooth under normal operating pressures within the cell, the central portion of said diaphragm being outwardly deflectable and being breakable by said tooth upon the development of a predetermined high gas pressure in said cell.

2. A galvanic cell sealing and pressure release device in accordance with claim 1 in which said cover has a raised circular central portion, an annular flange depending from the periphery of said central portion and an annular flange portion normally projecting obliquely outwardly and upwardly from the lower periphery of said flange at a small acute angle and to the base of said flange, said cover and flange having sufficient elasticity to afford a yielding continuous support for the rim of the diaphragm and inner periphery of the gasket.

3. In a normally sealed galvanic cell having a container subject to internal gas pressure and a cylindrical wall, a sealing and pressure relief device comprising; an annular hard plastic gasket which is resistant to cold flow fitting within said cylindrical wall and having a first flange extending over the top of said wall, and a second flange spaced downwardly from said first flange within the container; a thin metal diaphragm supported on said second flange for closing said container and having an upwardly projecting peripheral rim engaging an annular surface of said gasket; an annular, inverted, dish-shaped cover having a vent opening and an outer periphery disposed to back-up said rim of the diaphragm; a rigid tooth projecting downwardly from said cover and having a sharp end normally positioned adjacent to the upper surface of said diaphragm; and means confining said gasket under radial compression and in gas-tight sealing relation to said container wall and diaphragm at the periphery of said cover, said diaphragm having sufficient strength to resist puncture by said tooth under normal operating pressures within the cell, the central portion of said diaphragm being outwardly expandable and breakable by said tooth upon the development of a predetermined high gas pressure in said cell.

4. In a normally sealed galvanic cell having a container subject to internal gas pressure, a gas-tight closure and safety device comprising a cylindrical member communicating with the interior of said cell; an annular gasket of dielectric material fitting within said cylindrical member and having an annular flange defining a central opening and an upwardly projecting peripheral portion within said cylindrical member; a thin diaphragm supported at one side on said flange for closing said opening and having an upwardly projecting peripheral rim engaging an annular inner surface of said peripheral portion of said gasket; an annular cover having a vent opening, a central portion extending in spaced relation to said diaphragm and a downwardly offset outer peripheral flange disposed to back up said rim of said diaphragm at its inner peripheral side; a rigid tooth projecting from said cover toward said diaphragm and having a sharp end normally positioned adjacent to the outer central surface of said diaphragm, said diaphragm having sufficient strength to resist puncture by said tooth under normal operating pressures in said cell; and means confining said gasket under radial compression and in gas-tight sealing relation to said cylindrical member and the upwardly projecting rim of said diaphragm at the periphery of said cover, the central portion of said diaphragm being outwardly deflectable and breakable by said tooth upon the development of a predetermined abnormally high gas pressure in said cell.

5. A galvanic cell sealing and pressure release device in accordance with claim 4 in which said diaphragm is metallic and corrosion resistant and of such thickness, diameter and strength as to resist perforation by said tooth at a predetermined maximum normally high pressures within the cell.

6. A galvanic cell sealing and pressure release device in accordance with claim 5 in which said diaphragm is constructed from nickel plated strip steel, dead soft, and of thickness on the order of .006–.007 inch.

7. A galvanic cell sealing and pressure release device in accordance with claim 4 in which said diaphragm is of such strength, thickness and diameter as to relieve excess gas pressure from the cell by rupture of the diaphragm at the point of said tooth upon the development of internal pressures in excess of 150 p.s.i.

References Cited in the file of this patent
UNITED STATES PATENTS

| | | |
|---|---|---|
| 1,920,799 | Lilienfeld | Aug. 1, 1933 |
| 2,198,988 | Biniek | Apr. 30, 1940 |
| 2,693,499 | Newmann | Nov. 2, 1954 |